United States Patent [19]
Przybysz et al.

[11] Patent Number: 5,760,736
[45] Date of Patent: Jun. 2, 1998

[54] DIRECT X-BAND WAVEFORM GENERATOR

[75] Inventors: John Xavier Przybysz, Pittsburgh; Thomas J. Smith, Jr., Greensburg, both of Pa.

[73] Assignee: Northrop Grumman Corporation, Los Angeles, Calif.

[21] Appl. No.: 799,820

[22] Filed: Feb. 13, 1997

[51] Int. Cl.⁶ ........................................................ G01S 7/28
[52] U.S. Cl. ........................ 342/175; 342/204; 331/107 S
[58] Field of Search ................................. 342/175, 52, 82, 342/204; 324/248; 330/4.6; 331/107 S

[56] References Cited

U.S. PATENT DOCUMENTS

| | | | |
|---|---|---|---|
| 3,829,760 | 8/1974 | Bozanic et al. | 324/316 |
| 3,878,529 | 4/1975 | Bozanic et al. | 342/189 |
| 4,280,095 | 7/1981 | Hinton | 324/248 |
| 4,344,052 | 8/1982 | Davidson | 333/222 |
| 5,493,719 | 2/1996 | Smith et al. | 455/325 |
| 5,530,927 | 6/1996 | Smith | 455/317 |

OTHER PUBLICATIONS

"Fundamentals of Giaever and Josephson Tunneling", Y. Bruynseraede, C. Vlekken, C. Van Haesendonck and V.V. Moshchalkov, *The New Superconducting Electronics*, Kluwer Academic Publishers, pp. 1–28.

"Superconducting–Normal–Superconductor Junctions for Digital/Analog Converters", S.P. Benz, National Institute of Standards and Technology, Boulder, CO 80303.

"Josephson Voltage Standard –A Review", Clark A. Hamilton, Charles J. Burroughs and Samuel P. Benz, National Institute of Standards and Technology, Boulder, CO 80303.

*Primary Examiner*—John B. Sotomayor
*Attorney, Agent, or Firm*—Walter G. Sutcliff

[57] ABSTRACT

X-band signals are generated from the output of a Josephson junction array which is excited by a first RF frequency waveform digitally implemented in a data stream generated by a digital waveform generator gated by a stabilized local oscillator operating at a second frequency (X-band). The Josephson junction array outputs a digital data stream having pulses of quantum mechanically accurate uniform amplitude and picosecond pulsewidth. These pulses are fed to a bandpass filter which operates to extract a low phase-noise RF signal at X-band and consisting of the sum of the first and second frequencies and which can thereafter be used to generate transmit signals in a radar system and more particularly a cryogenic radar system.

20 Claims, 6 Drawing Sheets

DIRECT X-BAND WAVEFORM GENERATOR

CROSS REFERENCE TO RELATED APPLICATIONS

This application is related to U.S. Ser. No. 08/861,732 (RDS-95-038), entitled, "Cryogenic Radar System Including Josephson Junction Digital To Analog Converter", filed in the names of John X. Przybysz et al on May 22, 1997;

U.S. Ser. No. 08/854,856, (RDS-96-004), entitled, "High-Power Waveform Generator", filed in the names of John X. Przybysz et al on May 12, 1997; and U.S. Ser. No. 08/799,819, (RDS-96-006), entitled, "UHF Digital To Analog Converter For Cryogenic Radar", filed in the names of John X. Przybysz et al on Feb. 13, 1997.

These applications are assigned to the assignee of the present invention and are intended to be specifically incorporated herein by reference.

BACKGROUND OF THE INVENTION

1. Field of the Invention

This invention relates generally to microwave frequency signal generators and more particularly to a low phase-noise waveform generator utilizing Josephson junctions for generating X-band frequency signals.

2. Description of Related Art

Josephson junctions are well known devices consisting of two superconductors separated by a thin film of dielectric material or normal metal. Such devices are typically comprised of superconducting layers of Nb separated, by $AL_2O_3$ or superconducting layers of $YBa_2CU_3O_7$ separated by Co doped $YBa_2Cu_3O_7$. Josephson junctions produce quantum mechanically accurate voltage pulses generated as a result of phase slips in the quantum wave function of the superconductor system. This is accomplished by exploiting the now well known Josephson effect which is characterized by absolutely repeatable constant voltage steps in the junction's current-voltage characteristic. For a detailed treatment of Josephson junctions, one can refer to a publication entitled, *A New Superconducting Electronics*, Ed. by Harold Weinstock and Richard W. Ralston, (ISBN 0-7923-2515-X) Kluwer Academic Publishers, 1993.

In the above-noted related application U.S. Ser. No. 08/861,732 (RDS-95-038), there is disclosed a low phase-noise waveform generator for generating X-band signals utilizing a Josephson junction array. There the array is excited by a digital data stream incorporating a predetermined frequency spectrum. The Josephson junction array outputs a digital data stream having pulses of quantum mechanically accurate uniform amplitude. These pulses are fed to a low-pass analog signal filter which operates to retrieve analog signals having frequencies of the frequency spectrum in the digital data stream. By feeding the analog signals to a mixer along with a low phase-noise local oscillator generating a fixed frequency, a low phase-noise RF signal is generated which can be used for generating the transmit signals in a radar system so that enhanced detection of targets in "clutter" can be obtained.

SUMMARY

Accordingly, it is an object of the present invention to provide an improvement in the generation of low phase-noise RF signals.

It is another object of the invention to generate low phase-noise RF signals in the X-band frequency range.

It is a further object of the invention to provide a waveform generator which includes Josephson junctions.

It is yet another object of the invention to provide a low phase-noise waveform generator which includes a Josephson type digital to analog converter where signals are generated directly at X-band.

The foregoing and other objects are achieved by a method and apparatus for generating X-band signals directly from the output of a Josephson junction array which is excited by a digital data stream generated by a digital waveform generator gated by a low phase-noise cooled oscillator operating at X-band. The Josephson junction array outputs a digital data stream having pulses of quantum mechanically accurate uniform amplitude and picosecond pulsewidth. These pulses are fed to an analog bandpass filter which outputs a low phase-noise RF signal at X-band which can also include "chirp" signals and which can thereafter be used to generate transmit signals in a radar system and more particularly a cryogenic radar system.

Further scope of applicability of the present invention will become apparent from the detailed description provided hereinafter. It should be understood, however, that the detailed description and specific example, while indicating the preferred embodiment of the invention, is provided by way of illustration only, since various changes, alterations and modifications coming within the spirit and scope of the invention, will become apparent to those skilled in the art.

BRIEF DESCRIPTION OF THE DRAWINGS

The present invention will become more fully understood when considered together with the accompanying drawings which are provided by way of illustration only, and thus are not meant to be limitative thereto, and wherein.

DETAILED DESCRIPTION OF THE INVENTION

Figure 1:
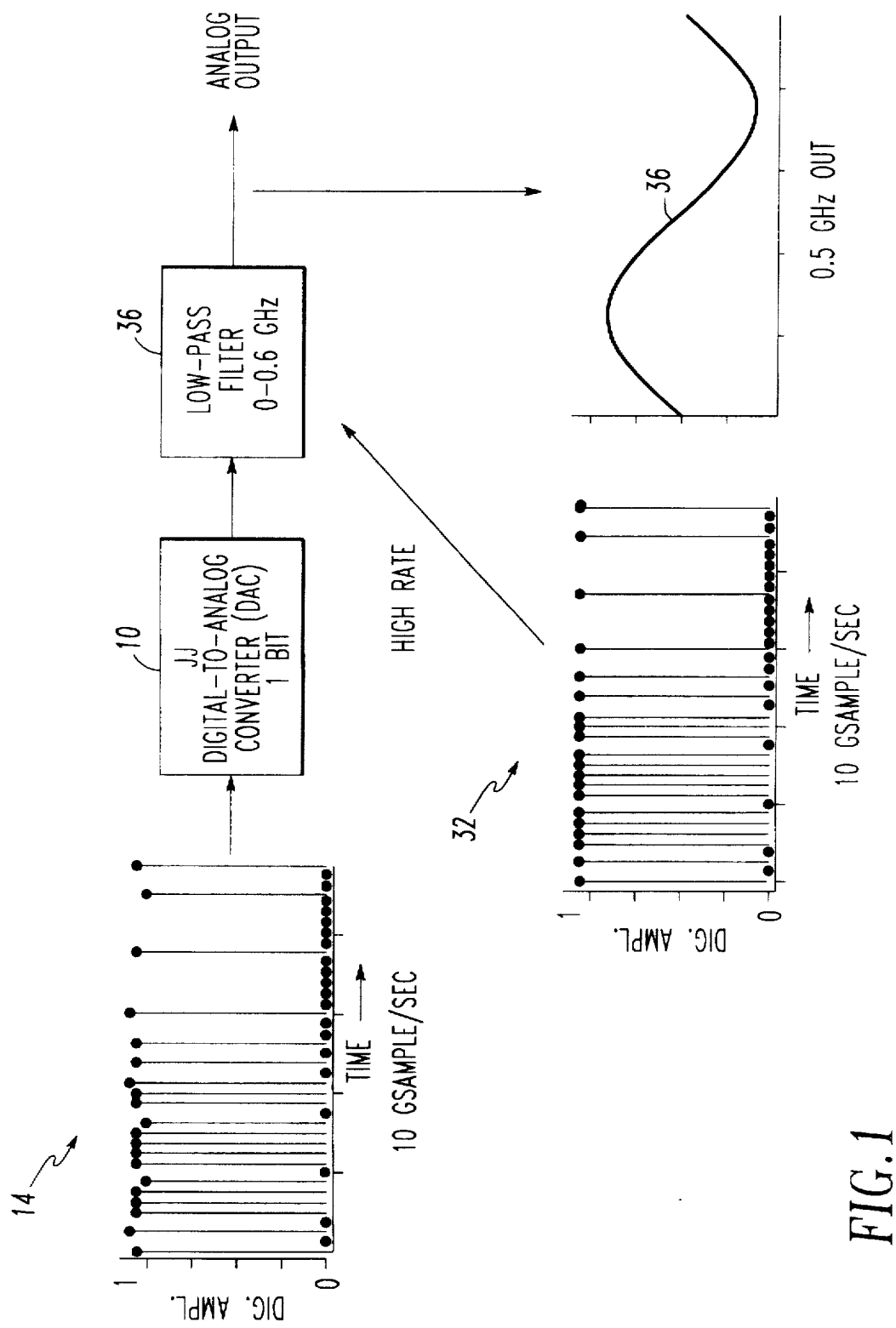
FIG. 1 is a diagram broadly illustrative of a related invention.
Figure 2:
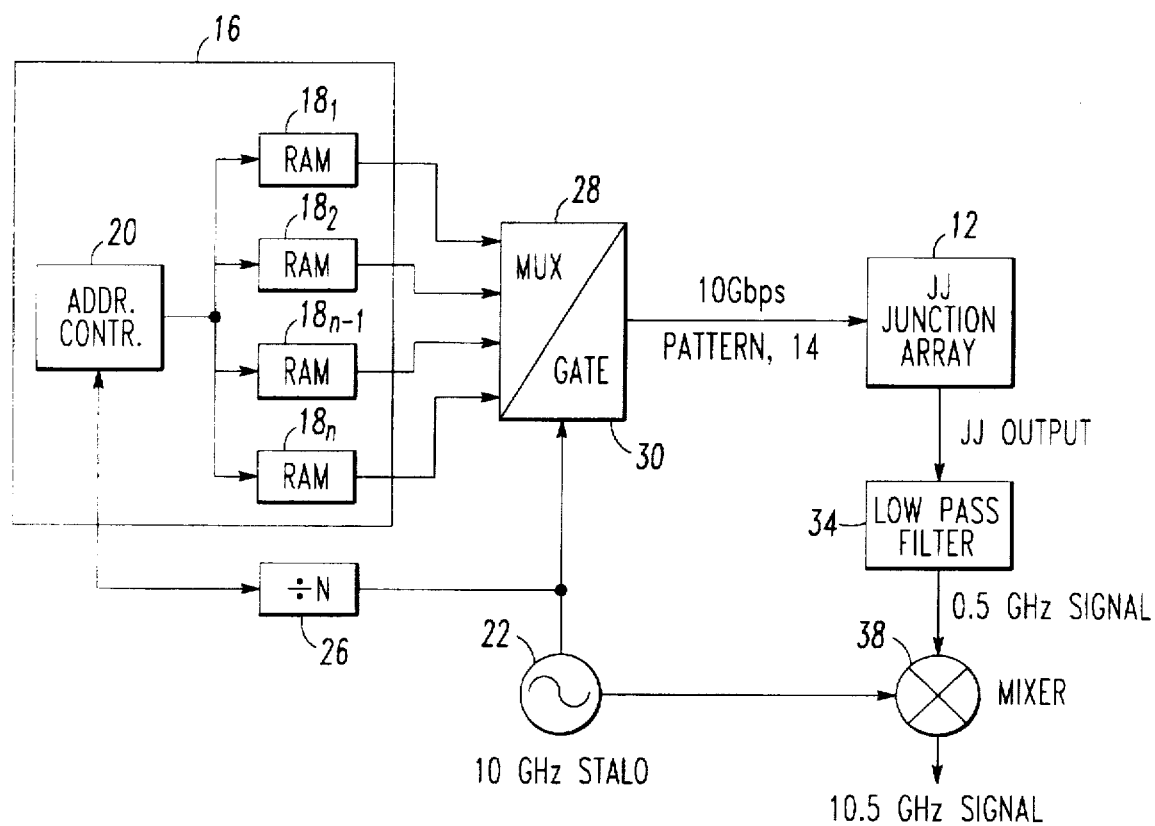
FIG. 2 is an electrical block diagram illustrative of an embodiment for implementing the related invention shown in FIG. 1.
Figure 3:
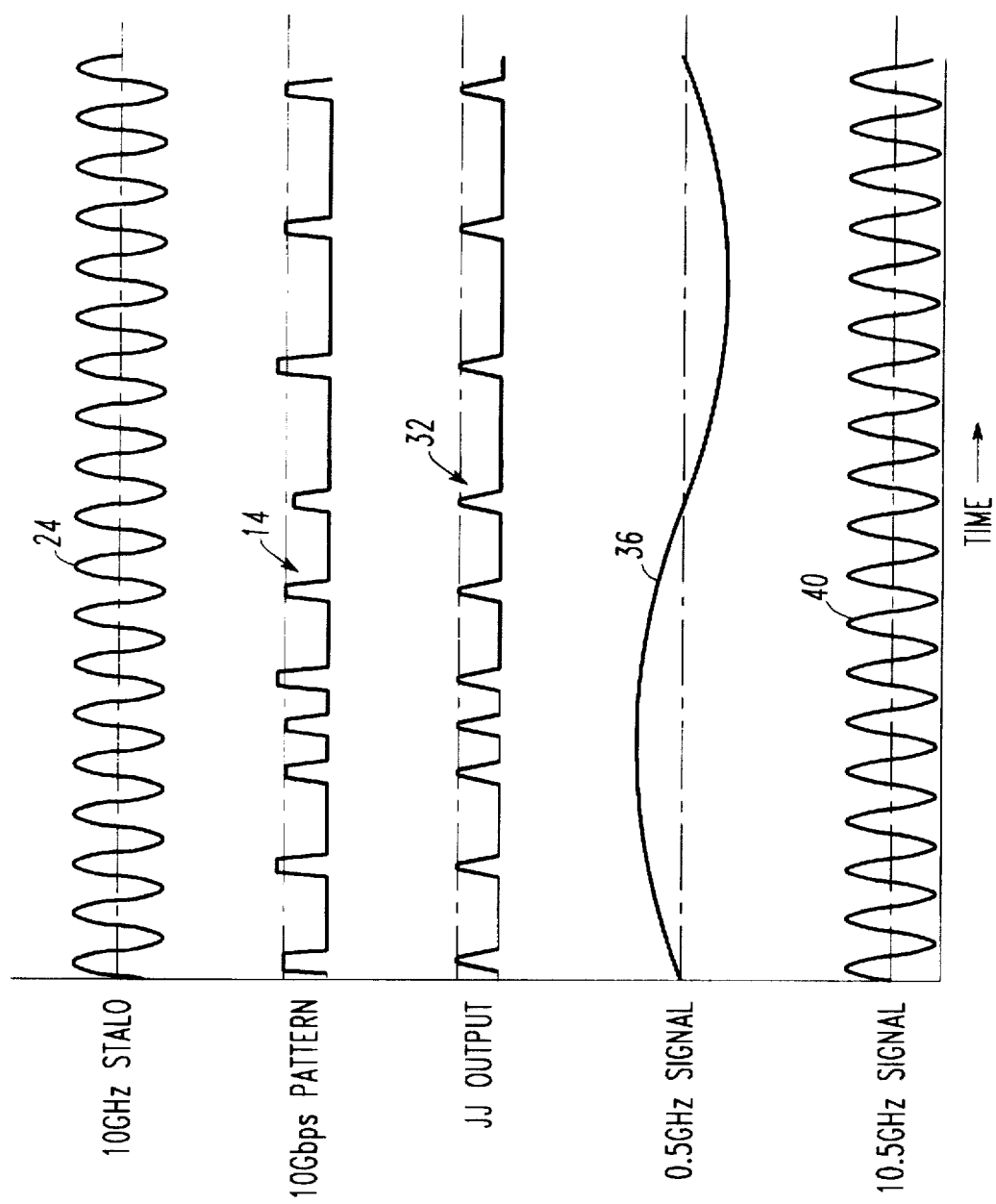
FIG. 3 is a set of waveform illustrative of the operation of the system shown in FIG. 2.
Figure 4:
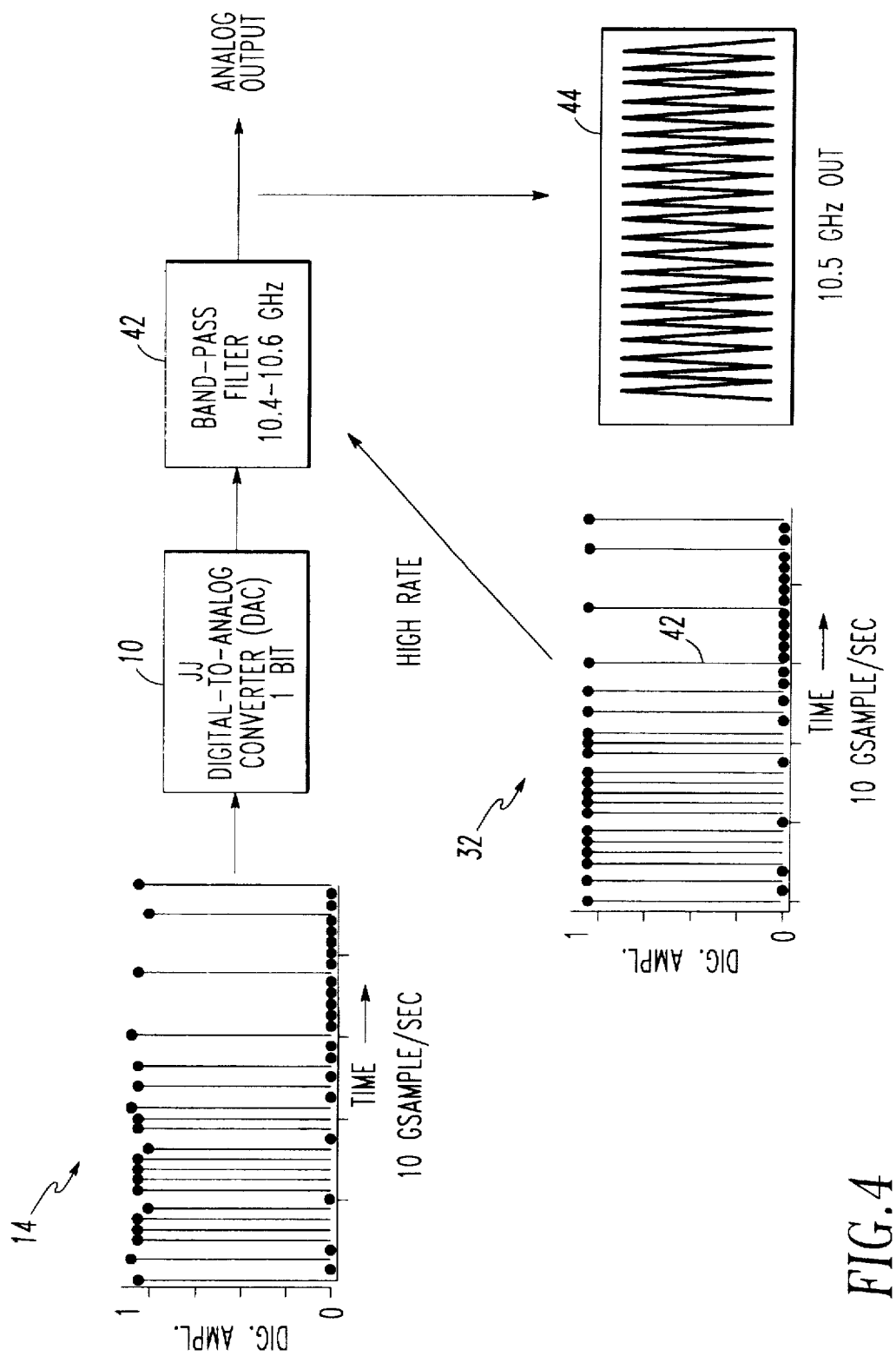
FIG. 4 is a diagram broadly illustrative of the subject invention.

Referring now to the drawings wherein like reference numerals refer to like elements throughout, FIGS. 1, 2 and 3 are illustrative of the invention disclosed in the above referenced related application Ser. No. 08/861,732 (RDS-95-038). As shown in FIG. 1, a Josephson junction digital to analog converter (DAC) 10 which includes a Josephson junction array 12 (FIG. 2), is excited by a digital data stream 14 having binary values of ONE and ZERO. The digital data stream 14 is further shown comprising a digital pattern of $10 \times 10^9$ samples per second, (GSamp/sec.) and which digitally implements a predetermined frequency or spectrum of frequencies therein. However, as shown, the digital ONE amplitudes are not necessarily of the same uniform amplitude, thereby still providing a source of amplitude modulation noise.

The digital pulse train pattern 14 is generated, for example, as shown in FIG. 2, by a waveform generator 16 comprising a plurality of random access memories (RAMs) $18_1, 18_2 \ldots 18_{n-1}, 18_n$, which are preferably programmed with variable frequency data for the generation of a "chirp" signal spectrum, i.e. a signal whose frequency is swept linearly or nonlinearly over a predetermined band of frequencies. Chirp signals are used in radar systems, particularly synthetic aperture radars or pulse Doppler radars, in order to provide range compression and subclutter visibility of small targets.

The RAMs $18_1 \ldots 18_n$ are controlled by an address controller 20 which is responsive to a clock signal comprising a sub-multiple of the frequency generated by a stabilized local oscillator (STALO) 22 operating at X-band, for example, 10 GHZ and whose waveform is shown by reference numeral 24 in FIG. 3. The submultiple of the STALO output frequency is provided by a frequency divider 26.

The respective digital outputs from the RAMs $18_1 \ldots 18_n$ are fed via a multiplexer 28 to a gate circuit 30 which is clocked by the 10 GHz output from the STALO 22, thus providing a 10 Gsps digital data stream 14. When fed to the Josephson junction array 12, every digital ONE pulse of the digital data stream 14 is outputted therefrom having an identical quantum mechanically precise amplitude as shown by reference numeral 32 and thus comprises a digital data stream which is substantially free of amplitude modulation noise.

As shown in FIG. 2, the 10 GSamp/sec. output 32 from the Josephson junction array 12 is fed to a low pass filter 34 having a pass-band, for example, from DC to 0.6 Ghz. The low pass filter 34 therefor operates to extract an analog signal 36 from the Josephson junction output 32 when the waveform generator 16 generates a frequency waveform in the region up to 0.6 GHz.

Further, as shown in FIG. 2, the analog waveform 36 from the low pass filter 34 is fed to a mixer 38 which additionally receives a 10 GHz input from the STALO 22. When the STALO 22 comprises a cryogenic stabilized oscillator, comprised of, for example, a cryogenically cooled dielectric (sapphire) resonator, a low phase-noise signal will be generated at 10 GHz, which when applied to the mixer 38 along with the analog signal 36 from the low pass filter 34, generates a summed frequency 10.5 GHz analog output signal 40 as shown in FIG. 3. Although a single output frequency is depicted, the output frequency can be chirped to provide a swept frequency spectrum by suitable control of the RAMs $18_1 \ldots 18_n$. This now leads to a consideration of the present invention which has for its objective, generating a low phase-noise chirp signal directly at X-band, typically in the range of 10 GHz, while eliminating the need for mixers and other sources of phase noise. As in the system shown in FIG. 2, the waveform generator 16 generates, for example, a 0.5 GHz waveform and which is converted to a 10 GBPs pattern 14 via the gate 30 which is being driven by the 10 GHz STALO signal. The Josephson junction array 12 again produces a digital pulse train 32 with ZERO amplitude modulation noise.

Figure 5:
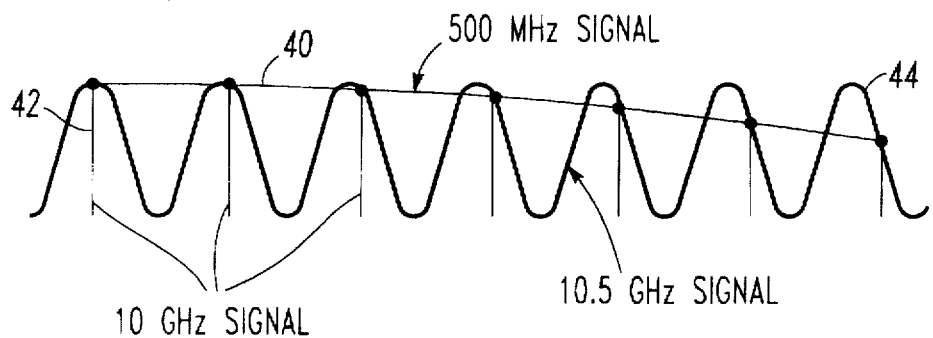
FIG. 5 is a waveform helpful in understanding the subject invention.
Figure 6:
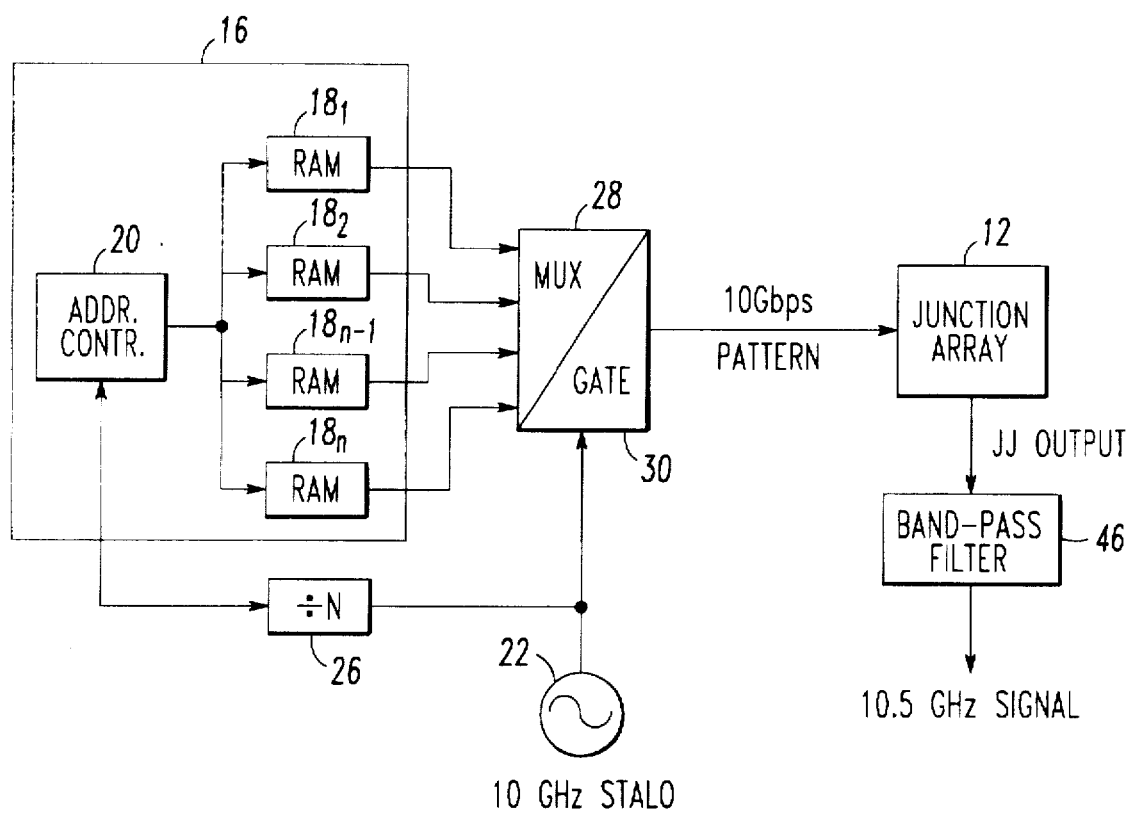
FIG. 6 is an electrical block diagram illustrative of the preferred embodiment of the subject invention.
Figure 7:
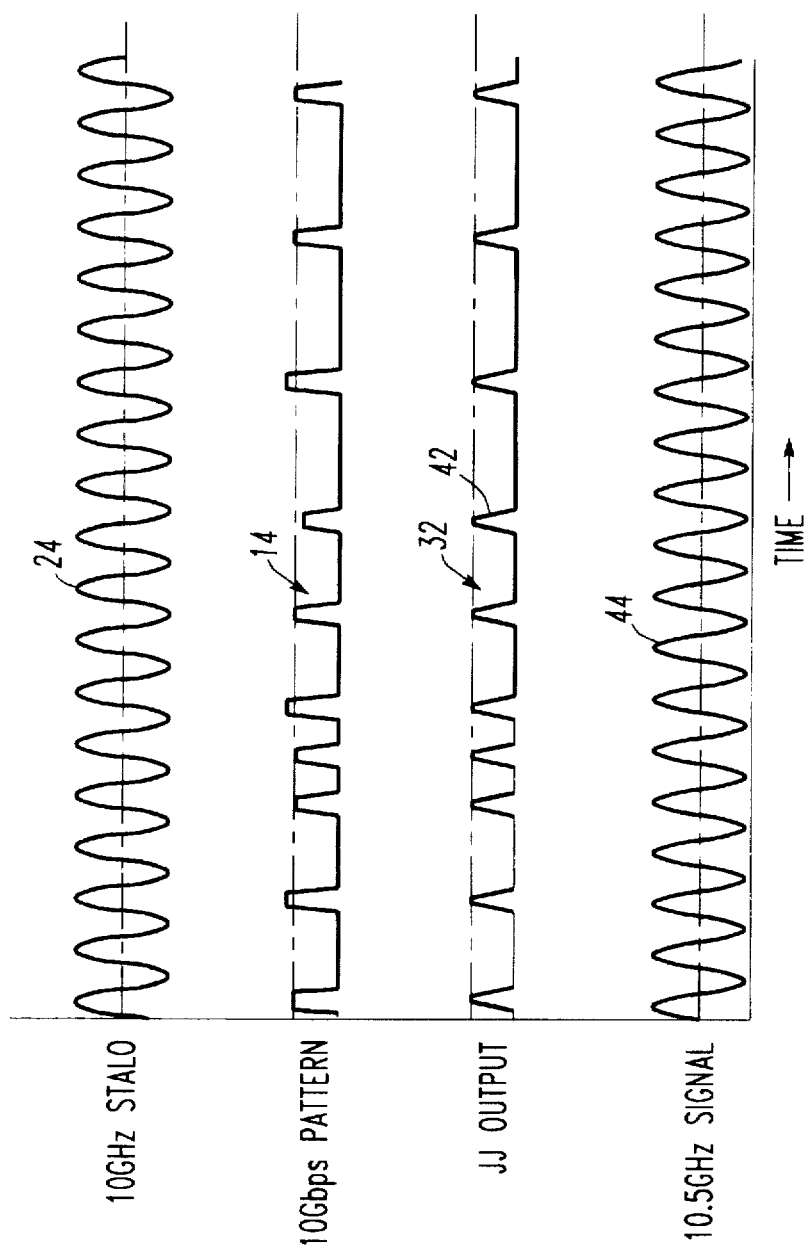
FIG. 7 is a set of waveforms illustrative of the operation of the embodiment shown in FIG. 6.

It was noted that the digital output 32 from the Josephson junction array 12 includes a combination, i.e. sum or difference of the 10 GHz signal 24 and the 0.5 GHz waveform 40, as shown in FIG. 5, when each Josephson pulse 42 from the Josephson junction array 12 is short compared to loopsec. Since Josephson pulses 42 are typically 7 psec. in duration, a low phase-noise signal 44 including a swept frequency (chirp) spectrum at X-band can be extracted from the pulses 42 output from the Josephson junction array 12. For example, a summed frequency 10.5 GHz chirp signal 44 can be extracted simply by substituting a bandpass filter 46 having a passband of, for example, 10.4–10.6 GHz in place of the low pass filter 36 as taught in the related application Ser. No. 08/861,732 (RDS-95-038).

The signal 44 then has the flexibility of digital generation along with the low phase-noise of the cooled STALO 22. This provides a significant advantage for a cryogenic radar system which has for its purpose the enhanced detection of targets in clutter.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the amended claims are herein meant to be included.

We claim:

1. Apparatus for generating a low phase-noise RF signal, comprising:

a Josephson junction excitation source for exciting a Josephson junction array with an excitation signal;

an array of series connected relatively low impedance Josephson junctions having an input end and an output end;

a relatively low impedance line of metallization located directly above and insulated from said array;

said input end of said array and one end of said line of metallization being commonly connected to said excitation source at a first circuit node;

an electrical impedance for terminating the output end of the array at a second circuit node;

a relatively high impedance signal filter having a predetermined frequency characteristic for providing an output signal related in frequency to the excitation signal; and an impedance matching transformer including primary and secondary windings, said primary winding being coupled between the other end of said line of metallization and said second circuit node and being responsive to a differential signal appearing across said array of Josephson junctions, said secondary winding being additionally coupled to the signal filter so as to match the impedance of the array to the impedance of the signal filter.

2. Apparatus according to claim 1 wherein said array of Josephson junctions comprises a linear array and wherein said line of metallization is located parallel to said linear array and configured to provide relatively low differential mode inductance and relatively high common mode rejection.

3. Apparatus in accordance with claim 2 wherein said combination of said first and second frequencies comprises the sum or difference of said first and second RF frequencies.

4. Apparatus in accordance with claim 3 wherein said digital data stream has binary amplitude values representative of a spectrum of first RF frequencies.

5. Apparatus in accordance with claim 4 wherein said spectrum comprises RF frequencies which are swept across a predetermined frequency band.

6. Apparatus in accordance with claim 4 wherein said spectrum comprises RF frequencies which are swept linearly across a predetermined frequency band.

7. Apparatus in accordance with claim 4 wherein said spectrum comprises frequencies which are swept non-linearly across a predetermined frequency range.

8. Apparatus in accordance with claim 4 wherein said spectrum comprises a chirp spectrum and wherein said low phase-noise RF output signal comprises a chirp signal.

9. Apparatus in accordance with claim 2 wherein said means for feeding comprises a gate circuit clocked by said signal of a second RF frequency.

10. Apparatus in accordance with claim 2 wherein said means for generating a digital stream comprises a digital signal generator includes at least one random access memory programmed with a binary sequence representative of at least one first RF frequency signal.

11. Apparatus in accordance with claim 9 wherein said digital signal generator includes a plurality of random access memories programmed with a binary sequence representative of a predetermined band of chirp RF frequencies and multiplexer means coupled between said random access memories and said gate circuit.

12. Apparatus in accordance with claim 2 wherein said analog signal generator of said second RF frequency comprises a dielectric resonator.

13. A method of generating a low phase-noise RF signal, comprising the steps of:

forming a low impedance tap extending across the top of an array of Josephson junctions and providing a layer of insulation therebetween;

coupling one end of the array and one end of the tap to a Josephson junction excitation source;

terminating the other end of the array;

coupling the other end of the array and the other end of the tap to mutually opposite ends of a primary winding of a transformer;

coupling a secondary winding of said transformer to a bandpass filter having a predetermined bandpass characteristic;

exciting the array with a signal having a frequency component which is in the passband of said filter; and outputting a signal from the bandpass filter having a frequency corresponding to said frequency component.

14. A method of generating a low phase-noise RF signal for use in a cryogenic radar system comprising the steps of:

generating a digital data stream having binary amplitude values representative of an analog signal of at least a first RF frequency and having a pulse repetition rate of a second RF frequency;

converting the digital data stream to a data stream having quantum mechanically accurate binary amplitude values;

filtering said digital data stream having quantum mechanically accurate binary amplitude values to generate an analog signal having a third RF frequency which is a combination of said first and second RF frequencies.

15. A method in accordance with claim 14 wherein said step of generating a digital data stream of an analog signal of at least a first RF frequency comprises generating a digital data stream representative of a plurality of frequencies within a predetermined RF frequency range.

16. A method in accordance with claim 14 wherein said step of generating a digital data stream includes the step of generating a band of chirp RF frequency signals.

17. The method in accordance with claim 14 wherein said step of converting comprises the additional step of generating a clock signal of said second RF frequency and feeding said digital data stream having binary amplitude values through a Josephson junction array under the control of said clock signal.

18. A method in accordance with claim 17 wherein said clock signal is generated by a frequency stabilized oscillator.

19. A method in accordance with claim 14 wherein said combination of said first and second RF frequencies comprises a sum or difference of said frequencies.

20. The method in accordance with claim 19 wherein said first RF frequency is in the MHz frequency range and said second RF frequency is in the GHz frequency range.

* * * * *